United States Patent

Tsutsumi et al.

(10) Patent No.: US 9,388,730 B2
(45) Date of Patent: Jul. 12, 2016

(54) VENTILATION STRUCTURE FOR ENGINE COMPARTMENT

(71) Applicant: KOMATSU LTD., Minato-ku, Tokyo (JP)

(72) Inventors: Katsuhiro Tsutsumi, Hitachinaka (JP); Hirofumi Miyamoto, Tokyo (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/397,634

(22) PCT Filed: Sep. 5, 2013

(86) PCT No.: PCT/JP2013/073942
§ 371 (c)(1),
(2) Date: Oct. 28, 2014

(87) PCT Pub. No.: WO2014/065022
PCT Pub. Date: May 1, 2014

(65) Prior Publication Data
US 2015/0068470 A1    Mar. 12, 2015

(30) Foreign Application Priority Data
Oct. 25, 2012  (JP) .................... 2012-235912

(51) Int. Cl.
*B60K 11/00*        (2006.01)
*B60K 11/04*        (2006.01)
(Continued)

(52) U.S. Cl.
CPC .............. *F01P 11/10* (2013.01); *B60K 11/04* (2013.01); *B62D 25/10* (2013.01); *E02F 9/0833* (2013.01);
(Continued)

(58) Field of Classification Search
CPC ............... F01P 1/02; F01P 5/06; F01P 11/10; F01P 5/02; F02B 63/02
USPC ................... 123/41.7, 41.49; 180/54 A, 68 R
See application file for complete search history.

(56) References Cited

U.S. PATENT DOCUMENTS

| 4,071,009 A | 1/1978 | Kraina |
| 4,086,976 A * | 5/1978 | Holm ................. B60R 13/0838 123/41.49 |
| 2008/0169142 A1 * | 7/2008 | Kinoshita ............. B60K 11/08 180/68.1 |

FOREIGN PATENT DOCUMENTS

| CN | 1096848 A | 12/1994 |
| EP | 604936 B1 | 1/1998 |

(Continued)

OTHER PUBLICATIONS

International Search Report (ISR) dated Oct. 8, 2013, issued in International Application No. PCT/JP2013/073942.

(Continued)

*Primary Examiner* — Lindsay Low
*Assistant Examiner* — Syed O Hasan
(74) *Attorney, Agent, or Firm* — Holtz, Holtz & Volek PC

(57) ABSTRACT

A ventilation structure of an engine compartment that houses an engine and is adjacent to a cooling fan that supplies cooling air to a heat exchanger in a form of a radiator is provided. A ventilation structure of the engine compartment includes: an exterior cover with which the engine and the cooling fan are covered; and a ventilation duct that includes an inner surface of the exterior cover, in which a first end of the ventilation duct is open in the engine compartment while a second end of the ventilation duct intercommunicates with a surrounding area of the cooling fan.

7 Claims, 6 Drawing Sheets

(51) Int. Cl.
    *F02B 63/00*     (2006.01)
    *F01P 1/02*     (2006.01)
    *F01P 11/10*     (2006.01)
    *E02F 9/08*     (2006.01)
    *B62D 25/10*     (2006.01)
    *F01N 3/20*     (2006.01)
    *F01P 1/00*     (2006.01)

(52) U.S. Cl.
    CPC ............ *E02F 9/0866* (2013.01); *E02F 9/0891* (2013.01); *F01N 3/2066* (2013.01); *F01N 2590/08* (2013.01); *F01N 2610/02* (2013.01); *F01N 2610/11* (2013.01); *F01P 2001/005* (2013.01); *Y02T 10/24* (2013.01)

(56) References Cited

FOREIGN PATENT DOCUMENTS

| | | | |
|---|---|---|---|
| JP | 07125610 A | 5/1995 | |
| JP | 7215075 | * | 8/1995 |
| JP | 07215075 A | 8/1995 | |
| JP | 10286018 A | 10/1998 | |
| JP | 2007283801 | * | 1/2007 |
| JP | 2007283801 A | 11/2007 | |

OTHER PUBLICATIONS

International Preliminary Report on Patentability (IPRP) dated Apr. 28, 2015 issued in International Application No. PCT/JP2013/073942.

Extended European Search Report dated Nov. 30, 2015, issued in counterpart European Application No. 13849841.5.

Chinese Office Action (and English translation thereof) dated Mar. 11, 2016, issued in counterpart Chinese Application No. 201380016958.3.

* cited by examiner

VENTILATION STRUCTURE FOR ENGINE COMPARTMENT

TECHNICAL FIELD

The present invention relates to improvement in a ventilation structure of an engine compartment.

BACKGROUND ART

It has been known that particulate matters (PM) contained in exhaust gas discharged from an internal combustion engine (e.g., a diesel engine) are collected by a dedicated filter (i.e., Diesel Particulate Filter (DPF)). Such a DPF is often disposed together with an engine at an engine compartment in a working vehicle such as a wheel loader.

In the arrangement in which both the engine and the DPF are disposed in the engine compartment, since a temperature of the engine compartment is remarkably increased, a forcible ventilation of the engine compartment is desired. Patent Literatures 1 and 2 propose a ventilation structure for ventilating the engine compartment using a cooling fan in a heat exchanger compartment. In the structures of Patent Literatures 1 and 2, the engine compartment intercommunicates by a hose with a fan shroud in which the cooling fan is housed and air in the engine compartment is sucked out by rotation of the cooling fan.

With such a structure, the engine compartment can be ventilated to inhibit an increase in the temperature of the engine compartment. Moreover, since this structure does not include a cooling-air intake hole with a large opening-area in the engine compartment for inhibiting the increase in the temperature by sucking a large volume of cooling air through the intake hole, noise to the environment can also be inhibited.

CITATION LIST

Patent Literature(s)

Patent Literature 1: U.S. Pat. No. 4,086,976
Patent Literature 2: JP-A-2007-283801

SUMMARY OF INVENTION

Problems to be Solved by the Invention

However, in Patent Literatures 1 and 2, since the engine compartment intercommunicates with the fan shroud through the hose for ventilation, it is necessary to install the hose, which increases the number of steps for assembly. Moreover, the hose may disturb maintenance, which adversely affects maintenance performance.

An object of the invention is to provide a ventilation structure of the engine compartment so that the engine compartment is favorably ventilated and assembly performance and maintenance performance are improvable.

Means for Solving the Problems

According to a first aspect of the invention, a ventilation structure of an engine compartment that houses an engine and is adjacent to a cooling fan that supplies cooling air to a heat exchanger includes: an exterior cover with which the engine and the cooling fan are covered; and a ventilation duct including an inner surface of the exterior cover, in which a first end of the ventilation duct is open in the engine compartment, and a second end of the ventilation duct intercommunicates with a surrounding area of the cooling fan.

In the ventilation structure of the engine compartment according to a second aspect of the invention, the ventilation duct comprises an air passage defined by the inner surface of the exterior cover and a reinforcing member attached to the inner surface of the exterior cover.

According to a third aspect of the invention, the ventilation structure of the engine compartment further includes: a heat exchanger compartment in which the heat exchanger is housed; and a partitioning wall that is interposed between the heat exchanger compartment and the engine compartment to separate the heat exchanger compartment from the engine compartment.

In the ventilation structure of the engine compartment according to a fourth aspect of the invention, an exhaust gas aftertreatment device is provided in the engine compartment to purify exhaust gas discharged from the engine, and the first end of the ventilation duct is open toward the exhaust gas aftertreatment device.

In the ventilation structure of the engine compartment according to a fifth aspect of the invention, a cross-sectional area of the air passage of the ventilation duct is gradually decreased from the first end to the second end of the ventilation duct.

In the ventilation structure of the engine compartment according to a sixth aspect of the invention, the cooling fan is rotated in a fan shroud with which the surrounding area of the cooling fan is covered, the fan shroud is housed in a frame such that a periphery of the fan shroud is surrounded by the frame, and the second end of the ventilation duct intercommunicates with the surrounding area of the cooling fan through communication openings provided to the frame and the fan shroud.

According to the first aspect of the invention, since the ventilation duct is formed by using the inner surface of the exterior cover with which the engine compartment and the cooling fan are covered, the ventilation duct can be produced in advance inside the exterior cover when the exterior cover is produced. Accordingly, since it is not required to use a hose as in a conventional arrangement, installation of the hose can be omitted and maintenance is not hampered. Moreover, the engine compartment can be favorably ventilated by opening the sucking end of the ventilation duct to the engine compartment.

According to the second aspect of the invention, the air passage of the ventilation duct is formed by the reinforcing member attached to the inner surface of the exterior case. The reinforcing member is used for improving rigidity of the exterior case and the like, irrespective of necessity of ventilation of the engine compartment. Accordingly, a dedicated member for forming the ventilation duct is not necessary, so that the exterior cover can be easily produced at a reduced cost.

Since the heat exchanger compartment and the engine compartment are separated from each other by the partitioning wall, the cooling air supplied to the heat exchanger by the cooling fan seldom flows into the engine compartment, so that the temperature of the engine compartment is more likely to be increased. However, according to the third aspect of the invention, an increase in the temperature of the engine compartment can be inhibited by ventilation through the ventilation duct even in such a case.

According to the fourth aspect of the invention, although the temperature of the engine compartment is further increased by providing the exhaust gas aftertreatment device, an increase in the temperature of the engine compartment can be reliably inhibited by ventilating the engine compartment with the ventilation duct, thereby providing more outstanding advantages.

According to the fifth aspect of the invention, the cross-sectional area of the air passage of the ventilation duct is gradually decreased toward the cooling fan. Accordingly, in the ventilation duct, a flow rate of air flowing through the ventilation duct gradually becomes fast, thereby improving a suction ability by a negative pressure generated by rotation of the cooling fan.

According to the sixth aspect of the invention, a negative pressure can act on the second end of the ventilation duct by providing the communication openings on the fan shroud typically used for covering the cooling fan, the frame that supports the fan shroud, and the like, instead of extending and directly opening the second end of the ventilation duct to the surrounding area of the cooling fan.

DESCRIPTION OF EMBODIMENT(S)

An exemplary embodiment of the invention will be described below with reference to the drawings.

Figure 1:
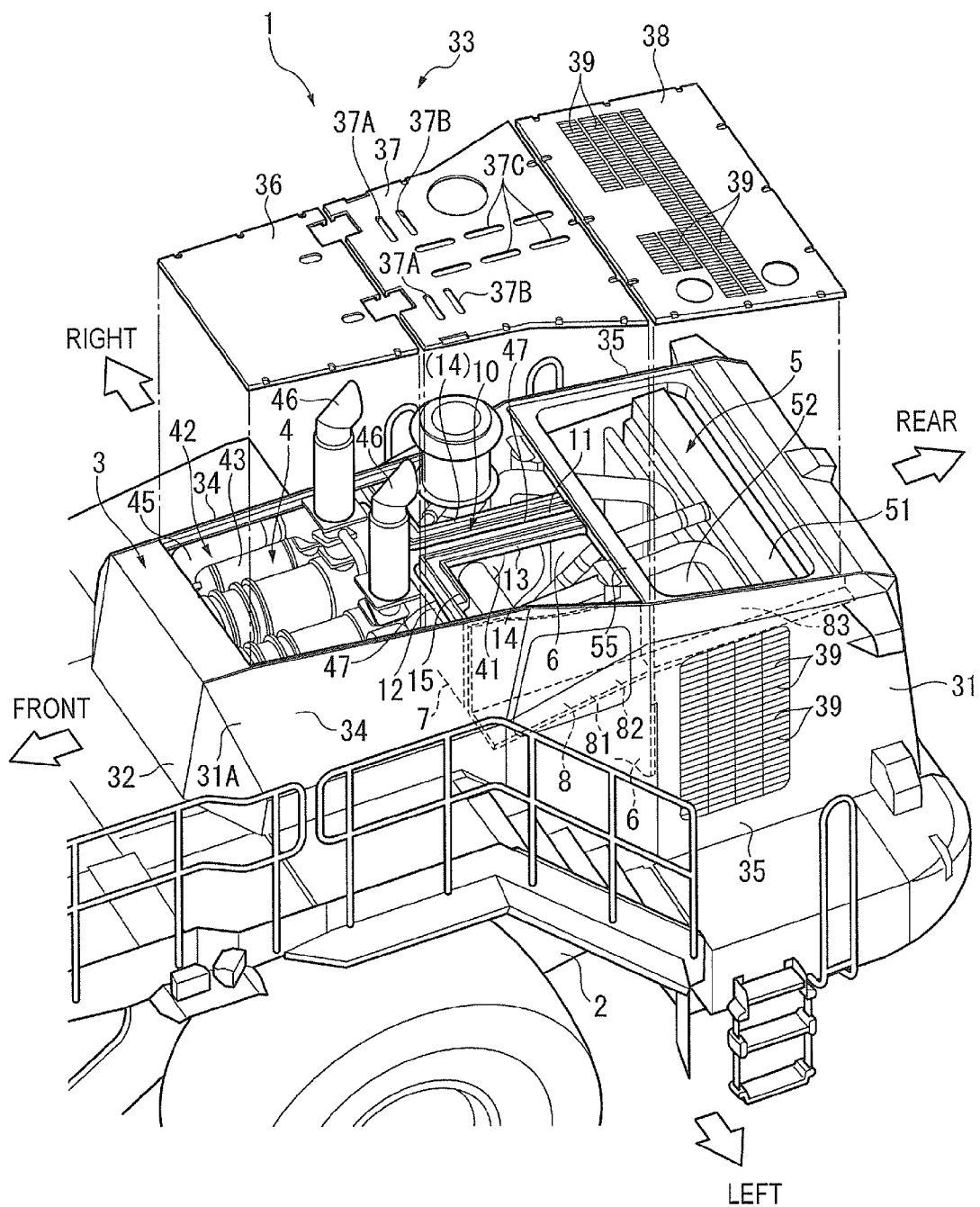
FIG. 1 is an exploded perspective view showing a part of a working vehicle provided with a ventilation structure of an engine compartment according to an exemplary embodiment of the invention.

FIG. 1 is an exploded perspective view showing a part of a working vehicle 1 provided with a cooling structure of an engine compartment 4 according to the exemplary embodiment of the invention.

Description of Overall Vehicle

In FIG. 1, the working vehicle 1 is in a form of a wheel loader including a front frame (not shown) and a rear frame 2 connected to the front frame in a manner capable of being articulated. Working equipment that includes a boom, a bell crank, a bucket and hydraulic actuators that actuate the boom, bell crank and the bucket is provided on the front frame of the working vehicle 1. It should be noted that an illustration and a description of the working equipment are omitted since the working equipment is not directly relevant to the invention.

On the rear frame 2 of the working vehicle 1 and behind a cab (not shown), the engine compartment 4 and a heat exchanger compartment 5 which are covered with an exterior cover 3 are juxtaposed in a front-rear direction. The engine compartment 4 and the heat exchanger compartment 5 are separated from each other by a partitioning wall in a form of a first partitioning wall 6. The first partitioning wall 6 vertically separates the engine compartment 4 from the heat exchanger compartment 5. A periphery of the first partitioning wall 6 is close to or in contact with an inner surface of the exterior cover 3.

The exterior cover 3 is attached via a support frame that stands on the rear frame 2, and the like. Specifically, the exterior cover 3 includes: side covers 31, 31 that respectively form right and left side walls of the engine compartment 4 and the heat exchanger compartment 5, a front cover 32 that forms a front-side wall of the engine compartment 4, a rear grill (not shown) that is openably/closeably attached to a frame 56 (see FIG. 4) in a rear portion of the heat exchanger compartment 5, and a hood 3 that forms a ceiling of the engine compartment 4 and the heat exchanger compartment 5.

The side cover 31 has a first side cover 34 in front of the first partitioning wall 6 and a second side cover 35 behind the first partitioning wall 6.

The hood 33 has a first upper cover 36 with which a front portion of the engine compartment 4 is covered, a second upper cover 37 with which a rear portion of the engine compartment 4 is covered, and a third upper cover 38 with which the entire heat exchanger compartment 5 is covered. The first to third upper covers 36 to 38 are detachably attached to the side cover 31, the front cover 32 and the like by an appropriate fastening means (e.g., a bolt).

The engine compartment 4 houses: an engine (not shown) mounted on the rear frame 2; an exhaust turbocharger 41, an EGR device, and an exhaust gas aftertreatment device 42 which are installed in the engine, pipes of these components and other auxiliary devices. The engine compartment 4 is divided into a front section and a rear section by a second partitioning wall 7 above the engine. Specifically, right and left side ends of the second partitioning wall 7 are close to or in contact with a vertical surface of a later-described ventilation duct 8 while a top end of the second partitioning wall 7 is close to or in contact with a lower surface of the second upper cover 37, whereby the compartment 4 is divided into the front section and the rear section.

However, since a lower end of the second partitioning wall 7 does not reach right and left sides of the engine, the front section and the rear section of the compartment 4 intercommunicate with each other under the second partitioning wall 7. The exhaust gas aftertreatment device 42 is disposed in a space in front of the second partitioning wall 7 while the other devices including the exhaust turbocharger 41 are disposed in a space behind the second partitioning wall 7.

The heat exchanger compartment 5 houses a radiator 51 (heat exchanger) that cools an engine cooling water, an after-cooler 52 (another heat exchanger) that cools intake air (supplied air) supercharged by the exhaust turbocharger 41, a fan shroud 53 (FIG. 3) disposed behind the radiator 51, an electric or hydraulic cooling fan 54 (FIG. 3) that is rotated with a part partially projecting beyond the fan shroud 53, and pipes of the components 51 to 54. Alternatively, a capacitor for an air conditioner, which is to be provided in the cab, may be provided in the heat exchanger compartment 5.

A rectangular frame plate 55 in a planar view is provided over the heat exchanger compartment 5. The third upper cover 38 is attached over the frame plate 55. The pipes of the radiator 51 and the after-cooler 52 penetrate the first partitioning wall 6 to be laid in the heat exchanger compartment 5 and the engine compartment 4. The cooling fan 54 is pivotally movable in a rear direction along with a frame that supports the cooling fan 54 in the same manner as the rear grill. By pivotally moving the cooling fan 54 so that the cooling fan 54 is separated from a radiation surface of the radiator 51, maintenance for clogging and the like of the radiator 51 can be performed.

When the cooling fan 54 is rotated, outer air (cooling air) flows into the heat exchanger compartment 5 through inlets 39 provided on the side cover 31 and the third upper cover 38 and a gap formed in the rear frame 2 under the heat exchanger compartment 5. The inflow cooling air passes through the after-cooler 52 and the radiator 51, thereby cooling the intake air and the engine cooling water. Subsequently, the cooling air is discharged from the rear grill through the cooling fan 54.

On the other hand, when the cooling fan 54 is driven, air in the engine compartment 4 is forcibly sucked toward the cooling fan 54 through the ventilation duct 8 defining the ventilation structure of the invention and is discharged from the rear grill through the cooling fan 54. While the air in the engine compartment 4 is kept being sucked, outer air (fresh air for ventilation) flows into the engine compartment 4 through the gap of the rear frame 2 under the engine compartment 4 to be sucked through the ventilation duct 8. This operation is repeated for ventilation of the engine compartment 4.

Figure 2:
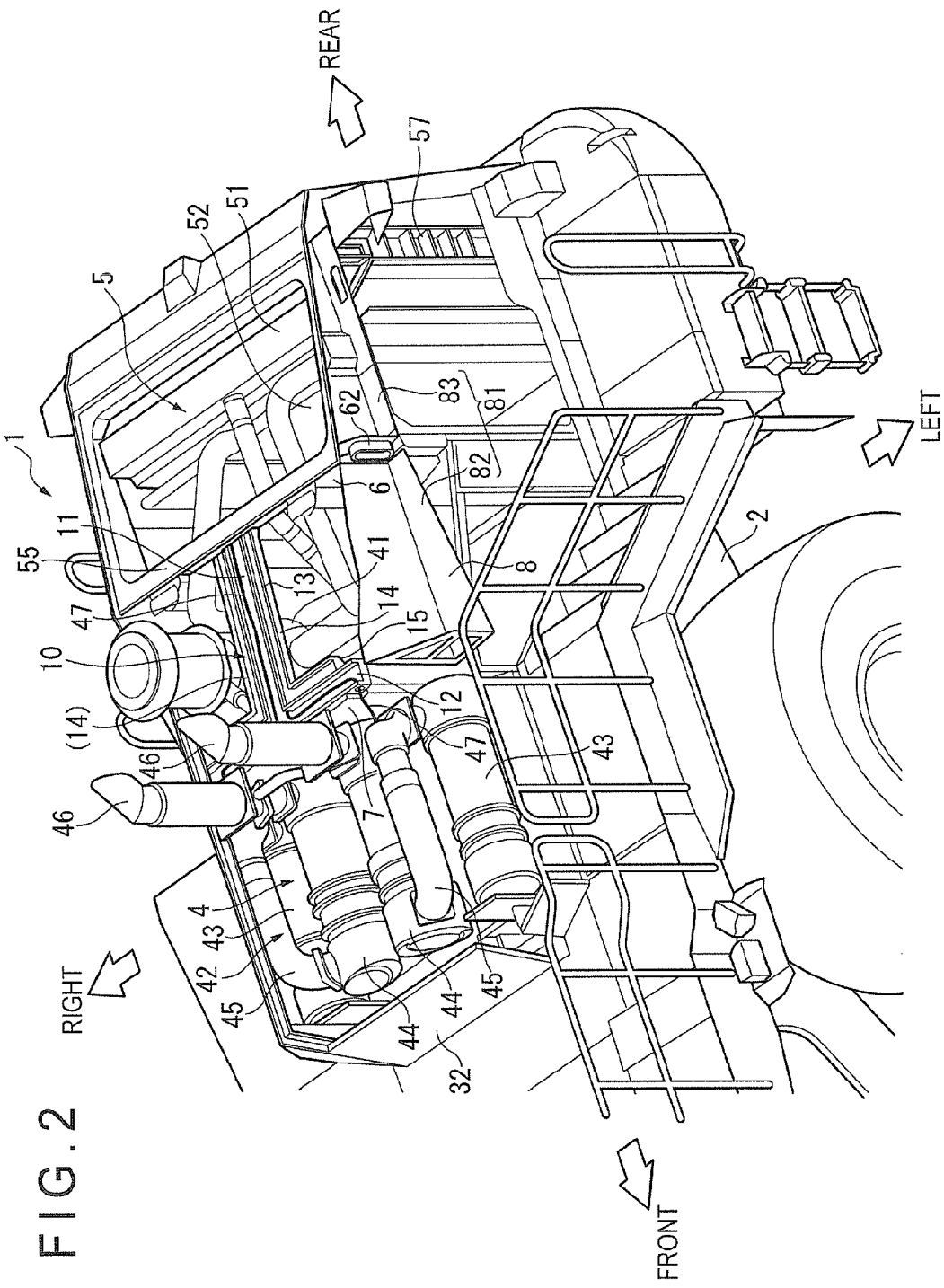
FIG. 2 is a perspective view showing the ventilation structure of the engine compartment.

FIG. 2 is a perspective view showing the ventilation structure of the engine compartment 4. FIG. 2 also shows a cooling structure of the urea aqueous solution pipe 47 connected to the exhaust gas aftertreatment device 42.

Herein, the exhaust gas aftertreatment device 42 includes: a pair of DPF (Diesel Particulate Filter) devices 43, 43 disposed on both right and left sides of the front section of the engine compartment 4; and SCR (Selective Catalytic Reduction) devices 44, 44 juxtaposed in a right-left direction between the DPF devices 43, 43.

An exhaust pipe connected to a turbine outlet of the exhaust turbocharger 41 is laid to a side of the engine compartment 4 to extend near the front of the engine, where an end of the exhaust pipe is bifurcated. A first portion of the bifurcated exhaust pipe is connected to a front portion of the DPF device 43 disposed to the left of the engine compartment 4. Exhaust gas flows into the DPF device 43 through the first portion. The inflow exhaust gas flows in the rear direction through the cylindrical DPF device 43 provided in the front-rear direction of the vehicle. Particulate matters are collected by an internal filter of the DPF device 43. Subsequently, the inflow exhaust gas flows into a mixing pipe 45 connected to a rear portion of the DPF device 43.

The mixing pipe 45 extends in a front direction and an end of the mixing pipe 45 is connected to a front portion of the left one of the SCR devices 44. In other words, the exhaust gas flows in the front direction through the mixing pipe 45. In this arrangement, an injector for injecting a urea aqueous solution is attached to a base end (near the DPF device 43) of the mixing pipe 45. The urea aqueous solution injected from the injector into the mixing pipe 45 is thermally decomposed into ammonia by heat of the exhaust gas. The ammonia flows into the SCR device 44 along with the exhaust gas.

The inflow exhaust gas and ammonia in the SCR device 44 flow in the rear direction through the cylindrical SCR device 44 in the front-rear direction of the vehicle and are supplied to a reduction-causing catalyst in the SCR device 44, thereby purifying nitrogen oxides in the exhaust gas. The exhaust gas in which nitrogen oxides are purified is discharged to the outside from the tail pipe 46 connected to a rear portion of the SCR device 44.

A second portion of the bifurcated exhaust pipe passes in front of the engine to extend to the right of the engine and is connected to the front portion of the DPF device 43 disposed to the right of the engine. Herein, subsequent flow and aftertreatment of the exhaust gas flowing into the DPF device 43 are the same as those in the DPF device disposed to the left of the engine compartment 4 and can be understood from the above description. Accordingly, the description herein is omitted.

In the exhaust gas aftertreatment device 42 according to the exemplary embodiment, the pair of SCR devices 44, 44 are disposed at the center over the engine. The DPF devices 43, 43 are respectively positioned at both shoulders of the engine at a level lower than the SCR devices 44, 44. Accordingly, the side cover 31 shown in FIG. 1 has a slant surface 31A that is slant downward from the center of the vehicle on the right and left sides of the vehicle at the areas corresponding to the positions of the disposed DPF device 43 and SCR device 44. With the slant surface 31A, visibility of right and left sides of the rear portion of the vehicle from the cab is improved.

Description of Ventilation Structure of Engine Compartment

In FIGS. 1 and 2, inside each of the right and left side covers 31, the ventilation duct 8 is provided approximately from the middle of the engine compartment 4 to the rear portion of the heat exchanger compartment 5. The aforementioned slant surface 31A is provided in the front-rear direction on an upper portion of each of the side covers 31. A reinforcing member 81 is attached to an inner surface of each of the side covers at a position substantially corresponding to the slant surface 31A. In FIG. 2, in order to show the reinforcing member 81 by a solid line, the reinforcing member 81 is removed from each of the side covers 31 for convenience.

The reinforcing member 81 is intended to improve rigidity of each of the side covers 31 and includes: a first reinforcing member 82 that is provided to the first side cover 34 to be positioned in the engine compartment 4; and a rear-positioned second reinforcing member 83 that is provided to the second side cover 35 to be positioned in the heat exchanger compartment 5. The first and second reinforcing members 82 and 83 are shaped in an L-cross section. The ventilation duct 8 is formed using an inner surface (a surface facing the side cover 31) of the reinforcing member 81 and an inner surface of the side cover 31. The formed internal space functions as an air passage of the ventilation duct 8.

The first and second reinforcing members 82 and 83 are separated from each other by a bridging frame 61 (also see FIGS. 3 and 4) that bridges the right and left second side covers 31 (the second reinforcing members 83). Accordingly, each of the ventilation ducts 8 is divided in the middle of the front-rear direction by an end of the bridging frame 61. However, a communicating portion 62 is provided at the divided portion, so that air securely flows between the first and second reinforcing members 82 and 83. The bridging frame 61 is provided at a position corresponding to an upper portion of the first partitioning wall 6. An upper surface of the bridging frame 61 supports a frame on the front side of the frame plate 55.

A front end of the ventilation duct 8 is positioned near the second partitioning wall 7 of the engine compartment 4 and is open toward the exhaust gas aftertreatment device 42 disposed in front of the second partitioning wall 7. Into the ventilation duct 8, not only air heated by heat of the engine but also air heated by heat of the exhaust gas aftertreatment device 42 are forcibly sucked. Moreover, into the ventilation duct 8, air heated by the engine and the exhaust turbocharger 41 is also sucked from the space behind the second partitioning wall 7 through under the second partitioning wall 7.

In this arrangement, a cross-sectional area of the air passage of the ventilation duct 8 is gradually reduced from the front end to the rear end of the ventilation duct 8. In other words, the ventilation duct 8 is in a tapered shape. Accordingly, at the rear end having a reduced cross-sectional area, a negative pressure generated by rotation of the cooling fan 54 can favorably work. Moreover, pressure gradient can be formed in a long region extending over the ventilation duct 8 in the front-rear direction. Consequently, air in the engine compartment 4 can be reliably sucked in the rear direction.

Figure 3:
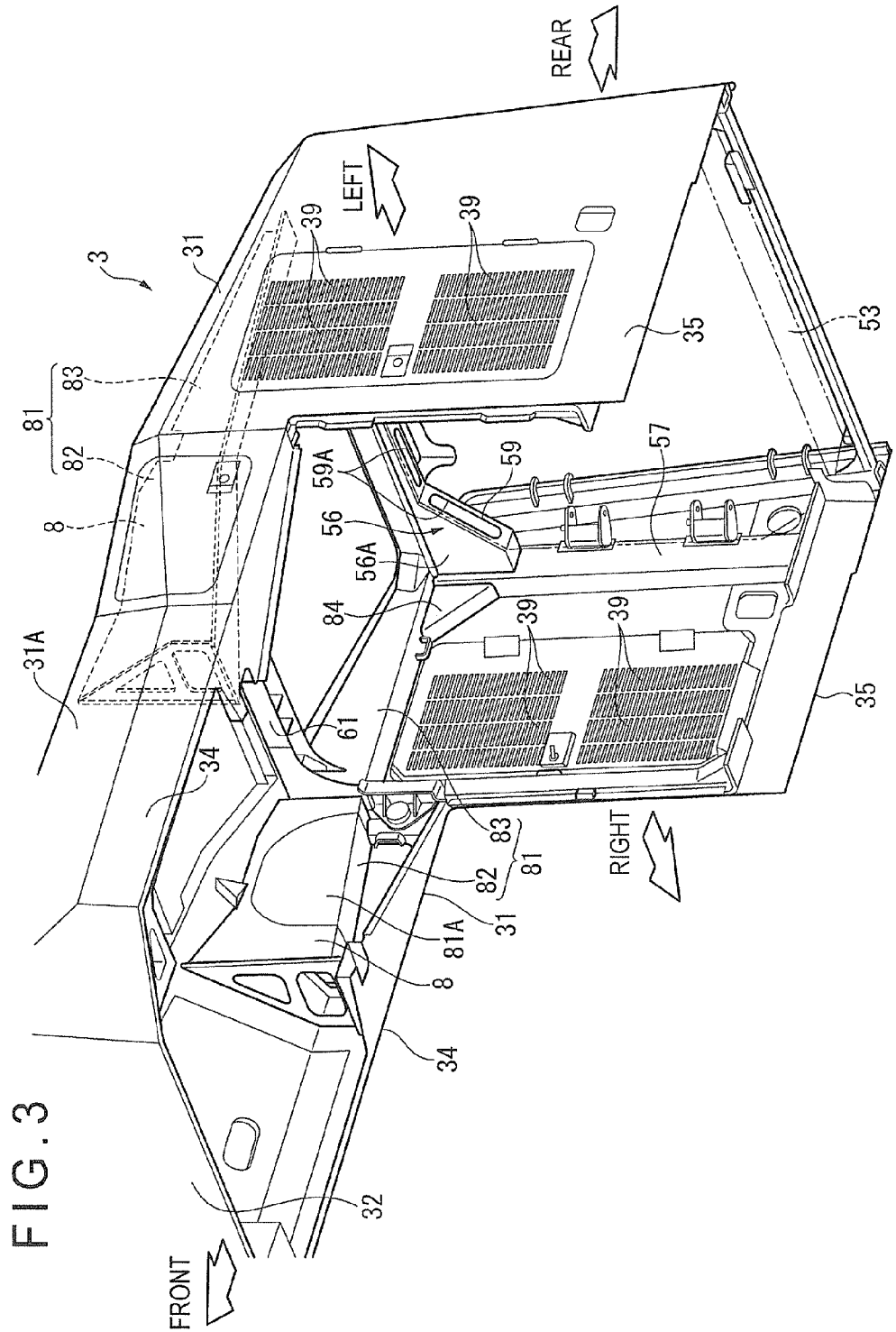
FIG. 3 is a perspective view showing a principal part of the ventilation structure of the engine compartment, seen from an obliquely lower side.
Figure 4:
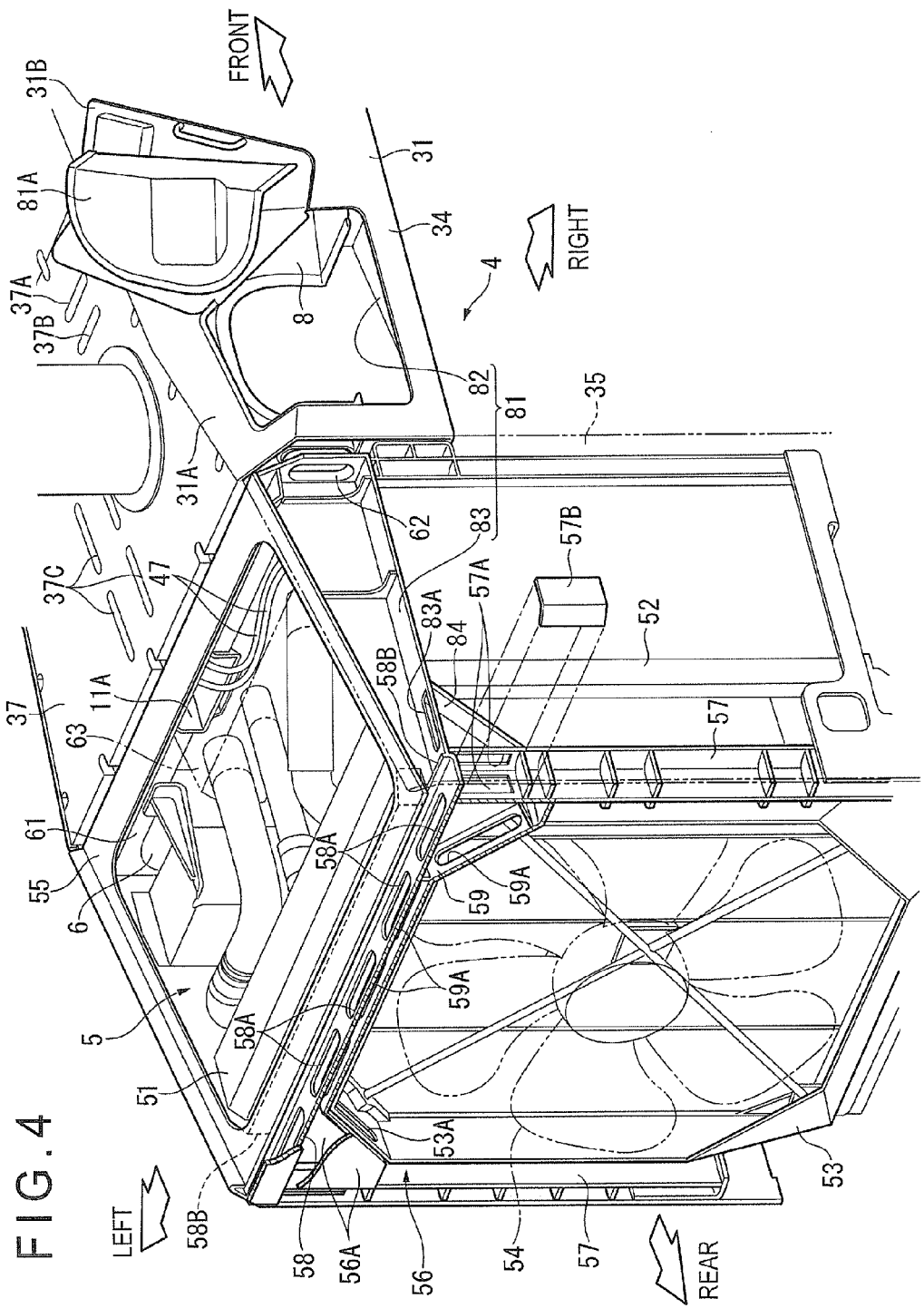
FIG. 4 is a perspective view showing the principal part of the ventilation structure of the engine compartment.

FIG. 3 is a perspective view showing the exterior cover 3 seen from a lower side, in which the ventilation structure of the invention is provided. FIG. 4 is a perspective view showing a principal part of the ventilation structure seen from the rear. It should be noted that the first and second partitioning walls 6 and 7 are not shown in FIG. 3 and the second partitioning wall 7 is not shown in FIG. 4.

In FIGS. 3 and 4, a portal frame 56 is attached to a rear end of the exterior cover 3 as a frame standing on the rear frame 2 (FIGS. 1 and 2). The portal frame 56 includes: a pair of right and left vertical frames 57, 57 that are respectively attached to vertical rear ends of the second side covers 35; a horizontal frame 58 that bridges top ends of the vertical frames 57, 57; and an intermediate frame 59 that is provided under the horizontal frame 58 and bridges the vertical frames 57, 57.

Each of the vertical frames 57 has an L-shaped cross section and stands with a corner facing an inside of the vehicle. A communication opening 57A is provided in each of pieces forming the L shape of an upper portion of the vertical frame 57. The portion of each of the vertical frames 57 in which the communication openings 57A are provided is covered with vertical ribs and a cover 57B to be laterally welded or the like.

The horizontal frame 58 is provided by a channel member having a concave cross section and is set with an opening facing upward. The upward opening of the horizontal frame 58 is covered with a third upper cover 38, whereby the horizontal frame 58 functions as an air passage in the right and left direction. A plurality of communication openings 58A are provided in the longitudinal direction on a bottom of the horizontal frame 58. Moreover, a cutout 58B is provided by cutting out each longitudinal end of a front web of the horizontal frame 58. The cutout 58B is connected with a rear end of the second reinforcing member 83 forming the reinforcing member 81, through which the ventilation duct 8 intercommunicates with the air passage in the horizontal frame 58.

The intermediate frame 59 is formed in an elongated plate. Both longitudinal sides of the intermediate frame 59 are bent downward and bonded to the vertical frames 57. Also in the intermediate frame 59, communication openings 59A similar to the communication opening 58A are provided at positions each substantially corresponding to the communication opening 58A of the horizontal frame 58.

A space surrounded by the upper portions of the vertical frames 57, the horizontal frame 58, and the intermediate frame 59 is covered with plates 56A on front and back sides of the space. The space covered with the plates 56A intercommunicates with the upper air passage through the communication openings 58A of the horizontal frame 58 while communicating with an inner space surrounded by the portal frame 56 through the communication openings 59A of the intermediate frame 59. Accordingly, the ventilation duct 8 intercommunicates with the inner space of the portal frame 56 through the space surrounded by the frames 57 to 59.

Moreover, substantially triangular spaces defined by each of the inclined sides of the intermediate frame 59 intercommunicate with spaces covered with the covers 57B in the upper portions of the vertical frames 57 through a first one of the communication openings 57A provided in each of the vertical frames 57. Further, a communication opening 83A is provided on the bottom of each of the second reinforcing members 83. A corner member 84 is provided at a corner formed by each of the vertical frames 57 and each of the second reinforcing members 83 so that a second one of the communication openings 57A and the communication opening 83A are covered with the corner member 84. Accordingly, the ventilation duct 8 also intercommunicates with the inner space of the portal frame 56 through the spaces surrounded by each of the corner members 84, the upper portion of each of the vertical frames 57 and the frames 57 to 59.

The fan shroud 53, which is a substantially octagonal frame, is housed in the inner space of the portal frame 56. The cooling fan 54 is rotated inside the fan shroud 53. An upper portion of the fan shroud 53 is close to the intermediate frame 59. Communication openings 53A are provided in the upper portion of the fan shroud 53 in a manner to correspond to each of the communication openings 59A of the intermediate frame 59. In other words, the communication openings 53A are open toward a surrounding area of the cooling fan 54, more specifically, toward a position that is adjacent to a rotation track of the outermost periphery of the cooling fan 54 and where a negative pressure is generated by the rotation of the cooling fan 54.

As described above, the ventilation structure of the engine compartment according to the exemplary embodiment is provided so that the negative-pressure generating part within the fan shroud 53 intercommunicates with the engine compartment 4 through the fan shroud 53, the inside of the portal frame 56 surrounding the fan shroud 53, and the ventilation duct 8 integrated with the exterior cover 3. FIG. 4 shows an open state of the inspection hatch 31B that is openably and closeably provided to the right side cover 31. The part of each of the reinforcing members 81 (the first reinforcing member 82) corresponding to the inspection hatch 31 defines an opening/closing portion 81A that is openable/closeable integrally with the inspection hatch 31.

According to the exemplary embodiment, when the cooling fan 54 is driven, a negative pressure generated by the driving of the cooling fan 54 causes air that is closer to a negative-pressure-generated part (e.g., the air in the portal frame 56) to start being sucked, so that the air in the engine compartment 4 is gradually sucked into the ducts 8. The sucked air passes through the ventilation ducts 8, which means the air flows in the rear direction bypassing the heat exchanger compartment 5. Since each of the ventilation ducts 8 is shielded from the heat exchanger compartment 5, air does not flow into the ventilation ducts 8 from the heat exchanger compartment 5, but the air in the engine compartment 4 is reliably sucked through the ventilation ducts 8.

The air flowing through the ventilation duct 8 partially flows into the horizontal frames 58 of the portal frame 56 from the rear end of each of the ventilation ducts 8 and is drawn inside the fan shroud 53 through the space surrounded by the frames 57 to 59. Moreover, the rest of the air flowing through the ventilation ducts 8 flows into the upper portion of each of the vertical frames 57 of the portal frame 56 from the rear end of the ventilation ducts 8 through the corner members 84 and is simultaneously drawn inside the fan shroud 53 through the space surrounded by the frames 57 to 59.

The drawn air is discharged outside by the rotation of the cooling fan 54. A volume equivalent to that of the air discharged from the engine compartment 4 is drawn in as fresh air from the outside through under the engine compartment 4 and is again sucked from the ventilation ducts 8. This operation is repeated for ventilation of the engine compartment 4. With this arrangement, even when the exhaust gas aftertreatment device 42 is disposed within the engine compartment 4, an excessive increase in temperature of the engine compartment can be reliably inhibited.

Cooling Structure of Urea Aqueous Solution Pipe

As shown in FIG. 2, an injector (not shown) is attached to a rear portion of the mixing pipe 45 of the exhaust gas aftertreatment device 42. The urea aqueous solution pipe 47 is connected to the injector. The urea aqueous solution pipe 47 extends from a urea aqueous solution tank set under the heat exchanger compartment 5 into the engine compartment 4 through the heat exchanger compartment 5 to be connected to the injector. In the heat exchanger compartment 5, a supply module is provided in the course of the urea aqueous solution pipe 47. With the supply module, the urea aqueous solution is pumped from the urea aqueous solution tank to the injector through the urea aqueous solution pipe 47.

Figure 5:
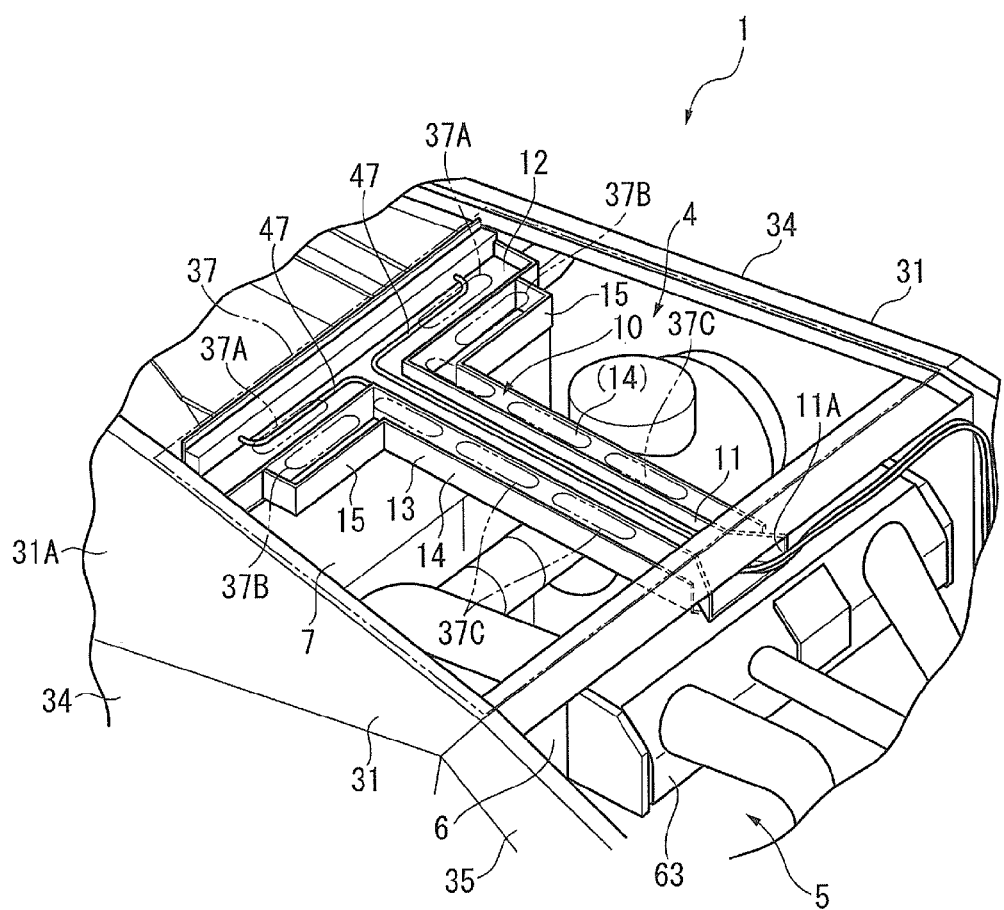
FIG. 5 is a perspective view showing a cooling structure of a urea aqueous solution pipe of the working vehicle.
Figure 6:
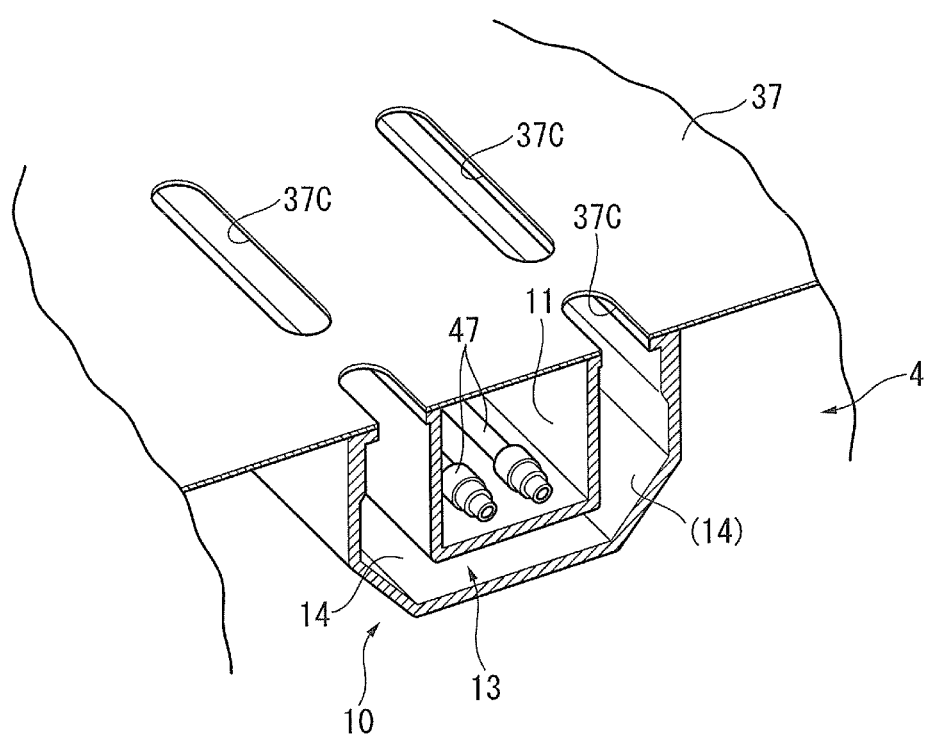
FIG. 6 is a cross-sectional perspective view showing a principal part of the cooling structure of the urea aqueous solution pipe.

FIG. 5 is a perspective view showing the cooling structure in the exemplary embodiment. FIG. 6 is a cross-sectional perspective view showing a principal part of the cooling structure.

In FIGS. 5 and 6, a pipeline-forming member 10 in which the urea aqueous solution pipe 47 is installed is provided on the rear of the second partitioning wall 7 in the engine compartment 4. The pipeline-forming member 10 is provided immediately under the second upper cover 37 of the hood 33 and in contact with the lower surface of the second upper cover. The pipeline-forming member 10, which is formed in a T-shape in a planar view, includes a first pipeline 11 that extends in the front-rear direction and a second pipeline 12 that extends in the right-left direction. The first and second pipelines 11 and 12 are each a cross-sectionally concaved groove having partitioning walls with an opening upward. A rear end of the first pipeline 11 penetrates the first partitioning wall 6 and is enlarged in a funneled shape to be open as an opening 11A in the heat exchanger compartment 5.

In the exemplary embodiment in which two mixing pipes 45 are provided on the right and left sides, two urea aqueous solution pipes 47 are used when installed in the pipeline-forming member 10. The two urea aqueous solution pipes 47 after passing through the heat exchanger compartment 5 are installed from the opening 11A through the first pipeline 11 and divided into right and left portions of the second pipeline 12. Each of the urea aqueous solution pipes 47 penetrates the second partitioning wall 7 from each end of the second pipeline 12 to extend to the front section in front of the second partitioning wall 7 to be connected to the injector.

The pipeline-forming member 10 further includes an air passage 13 in a T-shape in a planar view which is adjacent to the first and second pipelines 11 and 12. The air passage 13 includes first passages 14 that are laterally juxtaposed with the first pipeline 11 and second passages 15 that are juxtaposed at the rear of the second pipeline 12. The first and second passages 14 and 15 are also open upward.

The first passages 14 are defined by the partitioning walls of the first pipeline 11 and outer partitioning walls that cover the partitioning walls of the first pipeline 11. Cooling air flows through space between the inner and outer partitioning walls as described later. The first passages 14 are present under the first pipeline 11 in a cross-sectional view. In other words, the sides and the bottom of the first pipeline 11 are covered with the first passages 14 in a cross-sectional view.

The respective rear ends of the first passages 14 penetrate the first partitioning wall 6 to be open in the heat exchanger compartment 5. The respective openings of the first passages 14 face a bracket 63 that supports the pipes in the heat exchanger compartment 5. The bracket 63 is attached to the partitioning wall 6 while being open downward. Each of the second passages 15 is a cross-sectionally concaved groove having partitioning walls and is attached to a side of the second pipeline 12.

A rear end of the aforementioned pipeline-forming member 10 is supported by the first partitioning wall 6 while a front end of the pipeline-forming member 10 is supported by the right and left side covers 31 through an appropriate bracket.

The upward opening of the pipeline-forming member 10 is covered with the second upper cover 37. By covering the upward opening, the first and second pipelines 11 and 12 and the first and second passages 14 and 15 are formed in a tunnel.

In this arrangement, the second upper cover 37 includes: a pair of right and left elongated air intake holes 37A, 37A that are positioned above the second pipeline 12; a pair of air intake holes 37B, 37B that are similar to the air intake holes 37A, 37A and are positioned above the second passages 15; and a plurality of air intake holes 37C that are similar to the air intake holes 37A, 37A and are positioned above the first passages 14 in the front-rear direction.

In the pipeline-forming member 10 of which rear end intercommunicates with the heat exchanger compartment 5, when the cooling fan 54 in the heat exchanger compartment 5 is rotated, outer air (cooling air) flows inside through the air intake holes 37A, 37B and 37C of the second upper cover 37.

The cooling air flowing from the air intake holes 37B flows toward the rear through the second pipeline 12 and the first pipeline 11. By this flow of the cooling air, the urea aqueous solution pipes 47 and the first and second pipelines 11 and 12 that house the urea aqueous solution pipes 47 are cooled. The cooling air in this arrangement flows in a direction opposite to the urea aqueous solution flowing through the urea aqueous solution pipes 47. Subsequently, the cooling air flows into the heat exchanger compartment 5 from the enlarged opening 11A.

The cooling air flowing through the air intake holes 37B and 37 flows in the rear direction through the first and second passages 14 and 15 to block heat of the engine and the like in the engine compartment 4 from the first and second pipelines 11 and 12 and the urea aqueous solution pipes 47. Subsequently, the cooling air flows into the heat exchanger compartment 5 from the opening (not shown) provided in the first partitioning wall 6 and is regulated to flow downward by the bracket 63, thereby flowing along the first partitioning wall 6.

The cooling air flowing in the heat exchanger compartment 5 is transferred toward the after-cooler 52 and the radiator 51 along with another cooling air sucked by the cooling fan 54, and subsequently discharged from the rear grill through the cooling fan 54.

According to the cooling structure of the exemplary embodiment, since the urea aqueous solution pipes 47 are arranged within the pipeline-forming member 10 in the engine compartment 4, the urea aqueous solution pipes 47 are forcibly cooled by the cooling air flowing through the pipeline-forming member 10, so that the urea aqueous solution pipes 47 are unlikely to be thermally influenced in the engine compartment 4 to inhibit the urea aqueous solution from being deteriorated. Further, in addition to being shielded from heat by the first and second pipelines 11 and 12, the urea aqueous solution pipes 47 can also be shielded from heat by the cooling air flowing through the first and second passages 14 and 15 outside of the first and second pipelines 11 and 12 and the partitioning walls of the first and second passages 14 and 15, so that the urea aqueous solution pipes 47 are further unlikely to be thermally influenced.

The scope of the invention is not limited to the above-described embodiments, but includes modifications and improvements as long as an object of the invention can be achieved.

For instance, in the above exemplary embodiment, the rear end of the ventilation duct 8 and the surrounding area of the cooling fan 54 intercommunicate with each other through the portal frame 56 and the fan shroud 53. However, a hose and the like may be used for intercommunication at such a short section between the rear end of the ventilation duct and the surrounding area of the cooling fan. In short, it is only required that the air passage from the engine compartment to the portion where a negative pressure is generated by the cooling fan is mostly covered with the ventilation duct that is provided by using the inner surface of the exterior cover.

In the above exemplary embodiment, the cross-sectional area to the rear end of the air passage of the ventilation duct 8 is gradually decreased from the front end. However, a ventilation duct having an air passage of a substantially constant cross-sectional area may be used as long as the air passage has a cross-sectional area enough to reliably suck the air in the engine compartment.

In the above exemplary embodiment, the engine compartment 4 is provided with the exhaust gas aftertreatment device 42. However, the invention is applicable to an engine compartment without such an exhaust gas aftertreatment device. However, since the temperature in the engine compartment is significantly increased by providing the exhaust gas aftertreatment device, when the invention is applied to the engine compartment in which the exhaust gas aftertreatment device is provided, outstanding advantages can be obtained. Accordingly, since application of the invention to the engine compartment installed with the exhaust gas aftertreatment device brings many advantages, it is desirable to positively apply the invention to such an engine compartment.

In the above exemplary embodiment, the cooling air is supplied to the radiator 51 and the after-cooler 52 by the discharging-type cooling fan 54. However, the invention is also applicable to a cooling structure using a sucking-type cooling fan to cool the heat exchanger such as the radiator and the after-cooler. Particularly, in a structure where the heat exchanger compartment is separated from the engine compartment by the partitioning wall, since the cooling air does not flow into the engine compartment irrespective of the type of the cooling fan, it is desirable to apply the invention to the engine compartment for ventilation.

In the above exemplary embodiment, the cooling air to the radiator 51 and the after-cooler 52 is supplied by the cooling fan 54. However, separate cooling fans may be provided to independently supply the cooling air. Moreover, in this arrangement, the ventilation duct may be in communication with the surrounding area of the cooling fan for the after-cooler instead of the cooling fan for the radiator. Alternatively, the ventilation duct may be in communication with the surrounding areas of both the cooling fans.

In the above exemplary embodiment, a pair of right and left ventilation ducts 8 are respectively formed using the inner surface of the side covers 31. However, the invention encompasses an arrangement in which a single ventilation duct is formed including the inner surface (lower surface) of the hood.

The invention claimed is:

1. A ventilation structure of an engine compartment that houses an engine and is adjacent to a cooling fan that supplies cooling air to a heat exchanger, the ventilation structure comprising:
    an exterior cover with which the engine and the cooling fan are covered; and
    a ventilation duct comprising an inner surface of the exterior cover,
    wherein:
    the cooling fan is rotated in a fan shroud with which a surrounding area of the cooling fan is covered,
    the fan shroud is housed in a frame such that a periphery of the fan shroud is surrounded by the frame,
    the frame comprises a pair of vertical frames extending in a vertical direction and a horizontal frame disposed between upper ends of the vertical frames, at least one of the vertical frames comprising a first communication opening, and the horizontal frame comprising a second communication opening,
    the fan shroud comprises a third communication opening,
    a first end of the ventilation duct is open in the engine compartment, and
    a second end of the ventilation duct intercommunicates with the surrounding area of the cooling fan through the first, second, and third communication openings.

2. The ventilation structure of the engine compartment according to claim 1, wherein the ventilation duct comprises an air passage defined by the inner surface of the exterior cover and a reinforcing member attached to the inner surface of the exterior cover.

3. The ventilation structure of the engine compartment according to claim 1, further comprising:
    a heat exchanger compartment in which the heat exchanger is housed; and
    a partitioning wall that is interposed between the heat exchanger compartment and the engine compartment to separate the heat exchanger compartment from the engine compartment.

4. The ventilation structure of the engine compartment according to claim 1, wherein:
    an exhaust gas aftertreatment device is provided in the engine compartment to purify exhaust gas discharged from the engine, and
    the first end of the ventilation duct is open toward the exhaust gas aftertreatment device.

5. The ventilation structure of the engine compartment according to claim 1, wherein a cross-sectional area of an air passage of the ventilation duct is gradually decreased from the first end to the second end of the ventilation duct.

6. The ventilation structure of the engine compartment according to claim 1, wherein:
    the first communication opening is provided to an upper portion of each of the vertical frames,
    the second communication opening is provided along a longitudinal direction of the horizontal frame,
    the third communication opening is provided to an upper portion of the fan shroud,
    the first communication opening faces a part of the third communication opening near the vertical frames,
    the second communication opening faces the third communication opening, and
    the second end of the ventilation duct intercommunicates with the surrounding area of the cooling fan through the first and third communication openings and through the second and third communication openings.

7. The ventilation structure of the engine compartment according to claim 6, wherein:
    the frame further comprises an intermediate frame disposed below the horizontal frame and between the vertical frames,
    the intermediate frame comprises a fourth communication opening along a longitudinal direction thereof,
    a part of the fourth communication opening near the vertical frames is located between the first communication opening and the part of the third communication opening near the vertical frames, the first communication opening facing the part of the third communication opening near the vertical frames through the part of the fourth communication opening near the vertical frames,
    the fourth communication opening is located between the second and third communication openings, the second and third communication opening facing each other through the fourth communication opening, and the second end of the ventilation duct intercommunicates with the surrounding area of the cooling fan through the first, third and fourth communication openings and through the second, third and fourth communication openings.

\* \* \* \* \*